United States Patent
Chang

(10) Patent No.: US 9,525,821 B2
(45) Date of Patent: Dec. 20, 2016

(54) VIDEO STABILIZATION

(71) Applicant: MICROSOFT TECHNOLOGY LICENSING, LLC, Redmond, WA (US)

(72) Inventor: Ken Huagang Chang, Redmond, WA (US)

(73) Assignee: Microsoft Technology Licensing, LLC, Redmond, WA (US)

(*) Notice: Subject to any disclaimer, the term of this patent is extended or adjusted under 35 U.S.C. 154(b) by 0 days.

(21) Appl. No.: 14/641,995

(22) Filed: Mar. 9, 2015

(65) Prior Publication Data

US 2016/0269639 A1    Sep. 15, 2016

(51) Int. Cl.
- *H04N 5/232* (2006.01)
- *H04N 5/14* (2006.01)
- *G11B 27/031* (2006.01)

(52) U.S. Cl.
CPC ......... *H04N 5/23267* (2013.01); *G11B 27/031* (2013.01); *H04N 5/145* (2013.01); *H04N 5/23254* (2013.01)

(58) Field of Classification Search
CPC  H04N 5/23267; H04N 5/145; H04N 5/23254; G11B 27/031
USPC .......................................... 348/208.13, 208.4
See application file for complete search history.

(56) References Cited

U.S. PATENT DOCUMENTS

| 6,906,754 B1 | 6/2005 | Yerazunis et al. |
| 7,773,813 B2 | 8/2010 | Hua et al. |
| 8,179,446 B2 * | 5/2012 | Hong ............... H04N 5/145 348/208.6 |
| 8,724,854 B2 | 5/2014 | Jin et al. |
| 8,736,692 B1 | 5/2014 | Wong et al. |
| 2008/0165280 A1 | 7/2008 | Deever et al. |
| 2009/0079842 A1 * | 3/2009 | Wilson ............... H04N 5/23248 348/222.1 |
| 2011/0150093 A1 | 6/2011 | Mangiat et al. |
| 2013/0208134 A1 | 8/2013 | Hamalainen |
| 2014/0211032 A1 | 7/2014 | Owen et al. |
| 2014/0267801 A1 | 9/2014 | Grundmann et al. |

OTHER PUBLICATIONS

Liu, et al., "Bundled Camera Paths for Video Stabilization", In Journal of ACM Transactions on Graphics, vol. 32, Issue 4, Jul. 2013, 10 pages.

Sakols, Dan, "Stablilizing Long Sequences with WARP", Published on: Feb. 9, 2013 Available at: https://forums.creativecow.net/thread/3/936123.

"How ZeroShake Works", Published on: May 3, 2013 Available at: http://www.zeroshake.com/in-depth/how-it-works/.

(Continued)

*Primary Examiner* — Twyler Haskins
*Assistant Examiner* — Padma Haliyur
(74) *Attorney, Agent, or Firm* — Dave Ream; Tom Wong; Micky Minhas

(57) ABSTRACT

Aspects of the technology described herein provide a method of editing video to improve the apparent stability of the video footage. In one aspect, the apparent stability of the video image is improved by adding a border around an image captured within individual video frames and adjusting the relative position of consecutive video frames according to a negative of a movement vector calculated between the two consecutive frames.

20 Claims, 10 Drawing Sheets

(56) References Cited

OTHER PUBLICATIONS

Antunes, Jose, "Microsoft Says No To Shaky Videos", Published on: Aug. 11, 2014 Available at: http://provideocoalition.com/jantunes/story/microsoft-says-no-to-shaky-videos.

"Imovie Stabilization and Crop", Retrieved on: Sep. 29, 2014 Available at: https://discussions.apple.com/thread/6269284?tstart=0.

* cited by examiner

VIDEO STABILIZATION

BACKGROUND

Handheld video cameras can produce shaky videos when the videographer is not using a tripod or otherwise holding the video camera relatively still. Video editing software is available to edit an existing video to decrease shaking in the video.

SUMMARY

This summary is provided to introduce a selection of concepts in a simplified form that are further described below in the detailed description. This summary is not intended to identify key features or essential features of the claimed subject matter, nor is it intended to be used in isolation as an aid in determining the scope of the claimed subject matter.

Aspects of the technology described herein provide a method of editing video to improve the apparent stability of the video footage. As is known, video recorded using a camera that is moving or vibrating, such as a handheld camera, can have a shaky appearance. The shaky appearance is caused by changing location characteristics of the camera while shooting the video. For example, the camera could be rotating side to side, moving up and down, and/or changing depth while the video is recorded. In an aspect of the invention, a video is edited to improve the apparent stability of the video produced by a camera.

In one aspect, the apparent stability of the video image is improved by adding a border to individual video frames and adjusting the relative position of consecutive video frames according to a negative of a movement vector calculated for the video.

BRIEF DESCRIPTION OF THE DRAWINGS

Aspects of the invention are described in detail below with reference to the attached drawing figures, wherein.

DETAILED DESCRIPTION

Figure 1:
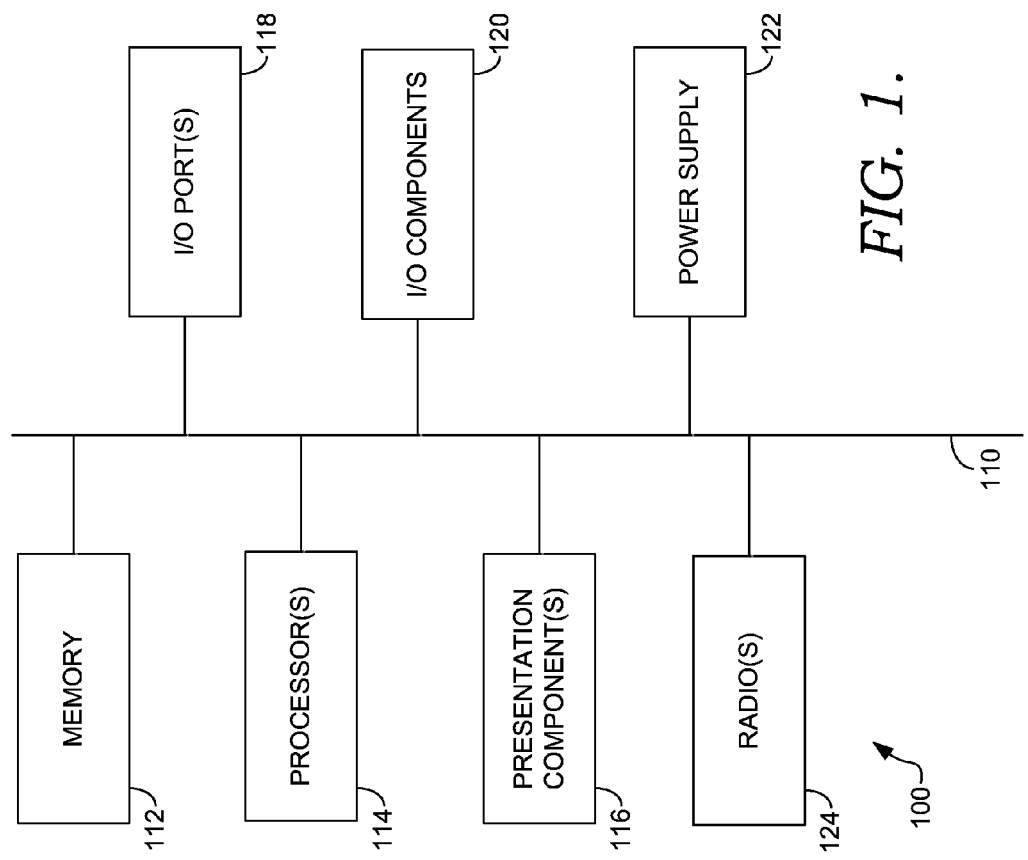
FIG. 1 is a block diagram of an exemplary computing environment suitable for implementing aspects of the technology described herein.

The subject matter of aspects of the invention is described with specificity herein to meet statutory requirements. However, the description itself is not intended to limit the scope of this patent. Rather, the inventors have contemplated that the claimed subject matter might also be embodied in other ways, to include different steps or combinations of steps similar to the ones described in this document, in conjunction with other present or future technologies. Moreover, although the terms "step" and/or "block" may be used herein to connote different elements of methods employed, the terms should not be interpreted as implying any particular order among or between various steps herein disclosed unless and except when the order of individual steps is explicitly described.

Aspects of the technology described herein provide a method of editing video to improve the apparent stability of the video footage. As is known, video recorded using a camera that is moving or vibrating, such as a handheld camera, can have a shaky appearance. The shaky appearance is caused by changing location characteristics of the camera while shooting the video. For example, the camera could be rotating side to side, moving up and down, and/or changing depth while the video is recorded.

Methods exist to improve the stability of the image while the image is being recorded. For example, physical stabilization mechanisms, such as stabilizing lenses, and digital mechanisms built into a camera can be used. Despite this technology, some videos will nevertheless appear shaky or destabilized. In one aspect, the technology described herein improves the functioning of a camera by improving the quality of video produced. In an aspect, a video is edited to improve the apparent stability of the video produced by a camera. Aspects of the technology described herein may be performed on a camera or by a separate computing device.

In one aspect, the apparent stability of the video image is improved by adding a border around individual video frames and adjusting the relative position of consecutive video frames according to a negative of a movement vector calculated for the video.

Aspects can use at least two different methods for adding a border to individual video frames. The first method adds a border to the original video frame without altering the image in the video frame. The second method adds a border after altering the image in the video frame to reduce the original image's overall size.

As used herein, the phrase "bordered frame" refers to a video frame with a border added via the first or second method. An "original frame" refers to a video frame without a border added via the stabilization process. The original frame is an input to the stabilization process described herein. The original frame includes an original image. The original image is the image within an original frame that enters the stabilization process described herein. An image may be described as "original" even though it may have undergone other processing or alterations unrelated to the stabilization process described herein.

The first method adds a border to each original frame without altering a size or pixel density of the original image in the original video frame. This first method produces bordered frames that have a larger overall size than the original frames. For example, if an original frame is 320× 140 pixels, then the bordered frame produced with the first method could be 350×170 pixels after a border with a 30 pixel width is added. The bordered frames produced by the first method will include the original image.

The second method adds a border to each original frame after altering a size of the original image to produce a reduced video frame. The original image may be reduced to generate the reduced frame by scaling, zooming out, cropping or by some other operations. This second method can produce bordered frames that have the same size as the original frames. For example, if an original frame is 320×140 pixels, then the bordered frame produced with the second method could be 320×140 pixels after a border with a 30 pixel width is added to a reduced image. The bordered frames produced by the second method will include the reduced image instead of the original image.

The second method could also produce a bordered frame that is smaller than the original frame. For example, if an original frame is 320×140 pixels, then the bordered frame produced with the second method could be 300×120 pixels after a border with a 30 pixel width is added to a reduced image. Again, the 300×120 bordered frame will include a reduced image rather than the original image.

The second method could also produce a bordered frame that is larger than the original frame. For example, if an original frame is 320×140 pixels, then the bordered frame produced with the second method could be 350×150 pixels after a border with a 60 pixel width is added to a reduced image. Again, the 350×150 bordered frame will include a reduced image rather than the original image.

In an aspect, the size of the border included on a bordered frame can be calculated using one or more movement vectors (explained in more detail below). For example, the border width can be equal to the average movement vector calculated across all of the one or more movement vectors, plus a standard deviation from the average. In another aspect, the border width is equal to twice the largest movement vector. In another aspect, the border width is between 5% and 10% of the original image's original height. In another aspect, the border width is between 5% and 10% of the original image's original width.

In one aspect, the border is a solid color such as black, blue, white, yellow, red, orange, purple, or such. In one aspect, the border color is selected to choose a contrast with the image shot in the video. For example, a blue border may be avoided when the image within a video frame includes a blue sky; instead black, green, orange, or some other contrasting color could be selected. In one aspect, black is the preferable border color.

In one aspect, the background color of a display can be set to match the border color. For example, video with a black border could be shown over a black background. In aspects of the technology, the edge of the bordered frames can jump around because of the image stabilization used to adjust a relative location of consecutive frames causing a background of the display to be visible at times. The bordered frame could also be a different color from the background color. The bordered frames can gyrate within an active display area of a display screen as the video is displayed. The gyrations may be concealed by matching the border and background color or revealed by choosing different colors for the background and border.

An aspect of the technology described herein can calculate a movement vector for a video. As is known, a video comprises a sequence of video frames. Different types of videos may comprise a different number or amount of frames per second. For example, a video could comprise 30 frames per second, 60 frames per second, or more. The shaky appearance of the video can result when the camera moves between recording consecutive frames. The movement vector is an estimate of the camera's movement derived from an analysis of the frames. When available, actual camera movement data could also be used to calculate the movement that occurred during filming. The camera movement data could be generated by accelerometers, gyroscopes, or other sensors in the camera. The camera data could be time synchronized with the frames to generate a movement vector. In an aspect, both video analysis and camera movement data are used to generate a movement vector. A movement vector can express camera movement in one, two, or three dimensions or axes. The movement can includes translation along the axis or a rotation around the axis.

Aspects of the technology described herein can calculate the amount of movement that occurred between frames by identifying an unmoving commonality within the consecutive images and calculating the amount of movement. This methodology will be illustrated in more detail subsequently, but an unmoving object could be a tree trunk, parked car, building, or other relatively fixed object within the video. In contrast, a person walking, running, or engaging in other forms of movement within the video would not be considered a fixed object.

Video image stabilization is a digital signal processing technique that can be applied to video to correct shaky video motion from hand shakiness or other causes. In one exemplary aspect, the technique involves calculating local motion vectors for macroblocks of each image of the video sequence relative to its preceding image.

Once a fixed object is identified, its location within each consecutive image can be calculated and a movement vector calculated by taking the difference between the object's location in the first frame and the second frame. Aspects of the technology described herein can then adjust the consecutive image's relative location to each other by shifting or warping the image in a direction opposite to the estimated motion vector. For example, if the movement vector calculated for a first frame and a second frame is 1 mm to the left then the second frame could be moved 1 mm to the right to help correct the shaky appearance of the video. This process can then be repeated for each consecutive frame. As an alternative, a movement vector is calculated across a series of frames and then the frames are adjusted towards a midpoint of the various movement vectors. Either way, the end result is an updated video where the images have been adjusted relative to one another in a way that tries to undo the movement of the camera. The present technology can adjust a relative location of bordered frames according to a negative of a movement vector.

Aspects of the technology described herein can edit video captured by multiple different types of cameras and recorded in one or more different formats. Exemplary cameras include handheld video recorders, handheld cameras, tablets, smartphones, athletic cameras, body cameras, virtual reality glasses cameras, WebCams, and other cameras capable of capturing video images. Possible video formats include any of the several Moving Picture Experts Group (MPEG) formats, M4V, 3rd Generation Partnership Project (3GPP), Windows Media Video (WAV), and other formats.

Having briefly described an overview of aspects of the technology described herein, an exemplary operating environment suitable for use in implementing aspects of the technology is described below.

Exemplary Operating Environment

Referring to the drawings in general, and initially to FIG. 1 in particular, an exemplary operating environment for implementing technology described herein is shown and designated generally as computing device 100. Computing device 100 is but one example of a suitable computing environment and is not intended to suggest any limitation as to the scope of use or functionality of the technology described herein. Neither should the computing device 100 be interpreted as having any dependency or requirement relating to any one or combination of components illustrated.

The technology of the present application may be described in the general context of computer code or machine-useable instructions, including computer-executable instructions such as program components, being executed by a computer or other machine, such as a personal data assistant or other handheld device. Generally, program components, including routines, programs, objects, components, data structures, and the like, refer to code that performs particular tasks or implements particular abstract data types. Aspects of the technology described herein may be practiced in a variety of system configurations, including handheld devices, consumer electronics, general-purpose computers, specialty computing devices, etc. Aspects of the technology described herein may also be practiced in distributed computing environments where tasks are performed by remote-processing devices that are linked through a communications network.

With continued reference to FIG. 1, computing device 100 includes a bus 110 that directly or indirectly couples the following devices: memory 112, one or more processors 114, one or more presentation components 116, input/output (I/O) ports 118, I/O components 120, and an illustrative power supply 122. Bus 110 represents what may be one or more busses (such as an address bus, data bus, or combination thereof). Although the various blocks of FIG. 1 are shown with lines for the sake of clarity, in reality, delineating various components is not so clear, and metaphorically, the lines would more accurately be grey and fuzzy. For example, one may consider a presentation component such as a display device to be an I/O component 120. Also, processors have memory. The inventors hereof recognize that such is the nature of the art and reiterate that the diagram of FIG. 1 is merely illustrative of an exemplary computing device that can be used in connection with one or more aspects of the technology described herein. Distinction is not made between such categories as "workstation," "server," "laptop," "handheld device," etc., as all are contemplated within the scope of FIG. 1 and refer to "computer" or "computing device."

Computing device 100 typically includes a variety of computer-readable media. Computer-readable media can be any available media that can be accessed by computing device 100 and includes both volatile and nonvolatile media, removable and non-removable media. By way of example, and not limitation, computer-readable media may comprise computer storage media and communication media. Computer storage media includes both volatile and nonvolatile, removable and non-removable media implemented in any method or technology for storage of information such as computer-readable instructions, data structures, program modules, or other data.

Computer storage media includes RAM, ROM, EEPROM, flash memory or other memory technology, CD-ROM, digital versatile disks (DVD) or other optical disk storage, magnetic cassettes, magnetic tape, magnetic disk storage or other magnetic storage devices. Computer storage media does not comprise a propagated data signal.

Communication media typically embodies computer-readable instructions, data structures, program modules, or other data in a modulated data signal such as a carrier wave or other transport mechanism and includes any information delivery media. The term "modulated data signal" means a signal that has one or more of its characteristics set or changed in such a manner as to encode information in the signal. By way of example, and not limitation, communication media includes wired media such as a wired network or direct-wired connection, and wireless media such as acoustic, RF, infrared, and other wireless media. Combinations of any of the above should also be included within the scope of computer-readable media.

Memory 112 includes computer-storage media in the form of volatile and/or nonvolatile memory. The memory 112 may be removable, non-removable, or a combination thereof. Exemplary memory includes solid-state memory, hard drives, optical-disc drives, etc. Computing device 100 includes one or more processors 114 that read data from various entities such as bus 110, memory 112, or I/O components 120. Presentation component(s) 116 present data indications to a user or other device. Exemplary presentation components 116 include a display device, speaker, printing component, vibrating component, etc. I/O ports 118 allow computing device 100 to be logically coupled to other devices including I/O components 120, some of which may be built in.

Illustrative I/O components 120 include a microphone, joystick, game pad, satellite dish, scanner, printer, display device, wireless device, a controller (such as a stylus, a keyboard, and a mouse), a natural user interface (NUI), and the like. In embodiments, a pen digitizer (not shown) and accompanying input instrument (also not shown but which may include, by way of example only, a pen or a stylus) are provided in order to digitally capture freehand user input. The connection between the pen digitizer and processor(s) 114 may be direct or via a coupling utilizing a serial port, parallel port, and/or other interface and/or system bus known in the art. Furthermore, the digitizer input component may be a component separated from an output component such as a display device or, in some embodiments, the usable input area of a digitizer may be co-extensive with the display area of a display device, integrated with the display device, or may exist as a separate device overlaying or otherwise appended to a display device. Any and all such variations, and any combination thereof, are contemplated to be within the scope of embodiments of the technology described herein.

An NUI processes air gestures, voice, or other physiological inputs generated by a user. Appropriate NUI inputs may be interpreted as ink strokes for presentation in association with the computing device 100. These requests may be transmitted to the appropriate network element for further processing. An NUI implements any combination of speech recognition, touch and stylus recognition, facial recognition, biometric recognition, gesture recognition both on screen and adjacent to the screen, air gestures, head and eye tracking, and touch recognition associated with displays on the computing device 100. The computing device 100 may be equipped with depth cameras, such as stereoscopic camera systems, infrared camera systems, RGB camera systems, and combinations of these, for gesture detection and recognition. Additionally, the computing device 100 may be equipped with accelerometers or gyroscopes that enable detection of motion. The output of the accelerometers or gyroscopes may be provided to the display of the computing device 100 to render immersive augmented reality or virtual reality.

A computing device may include a radio. The radio transmits and receives radio communications. The computing device may be a wireless terminal adapted to receive communications and media over various wireless networks. Computing device 100 may communicate via wireless protocols, such as code division multiple access ("CDMA"), global system for mobiles ("GSM"), or time division multiple access ("TDMA"), as well as others, to communicate with other devices. The radio communications may be a short-range connection, a long-range connection, or a combination of both a short-range and a long-range wireless telecommunications connection. When we refer to "short" and "long" types of connections, we do not mean to refer to the spatial relation between two devices. Instead, we are generally referring to short range and long range as different categories, or types, of connections (i.e., a primary connection and a secondary connection). A short-range connection may include a Wi-Fi® connection to a device (e.g., mobile hotspot) that provides access to a wireless communications network, such as a WLAN connection using the 802.11 protocol. A Bluetooth connection to another computing device is a second example of a short-range connection. A long-range connection may include a connection using one or more of CDMA, GPRS, GSM, TDMA, and 802.16 protocols.

Figure 2:
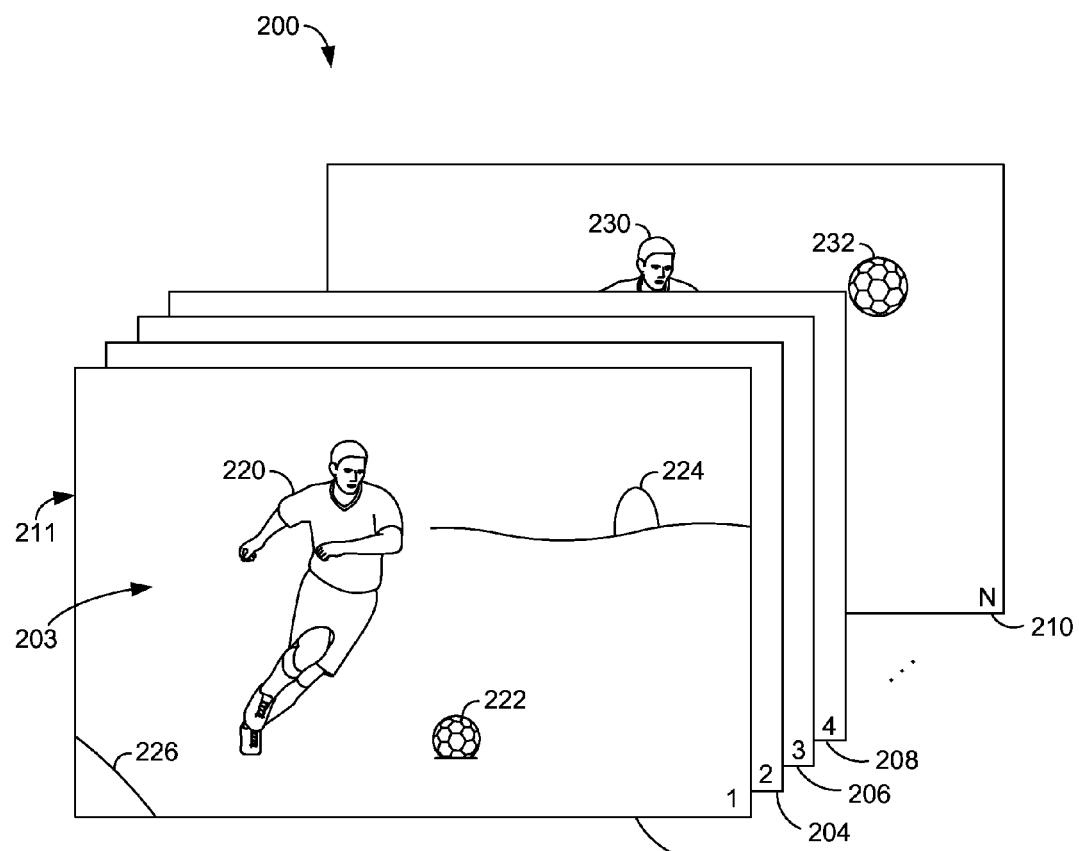
FIG. 2 is an illustration of a raw series of video frames suitable for editing by aspects of the technology described herein.

Turning now to FIG. 2, a raw series of video frames is illustrated. The present disclosure may describe video that has not been edited by aspects of the technology described herein as "raw" or "original." The original video may also be described as shaky or unstable. In each case, the meaning is more or less the same. The video 200 comprises a first video frame 202, a second video frame 204, a third video frame 206, a fourth video frame 208, and an Nth video frame 210. The Nth video frame 210 denotes the last video frame in the series. A video may include hundreds, thousands, or even hundreds of thousands of frames. Adjacent video frames such as the first video frame 202 and the second video frame 204 can be described as consecutive video frames. Consecutive video frames are adjacent to each other in order without an intervening video frame between them.

Each video frame in the video 200 comprises an image. The first image 203 in the first video frame 202 includes a moving soccer player 220 and a moving soccer ball 222. The first image 203 also includes a fixed boundary line 226 and a tree 224 in the background. The Nth video frame 210 includes a similar image. Each frame has a height, a width, and a perimeter, for example, perimeter 211. The height, width, and perimeter on the frame at the initiation of the video editing program may be described as "original." The image may also be described in terms of resolution, pixel density, and other characteristics.

Figure 3:
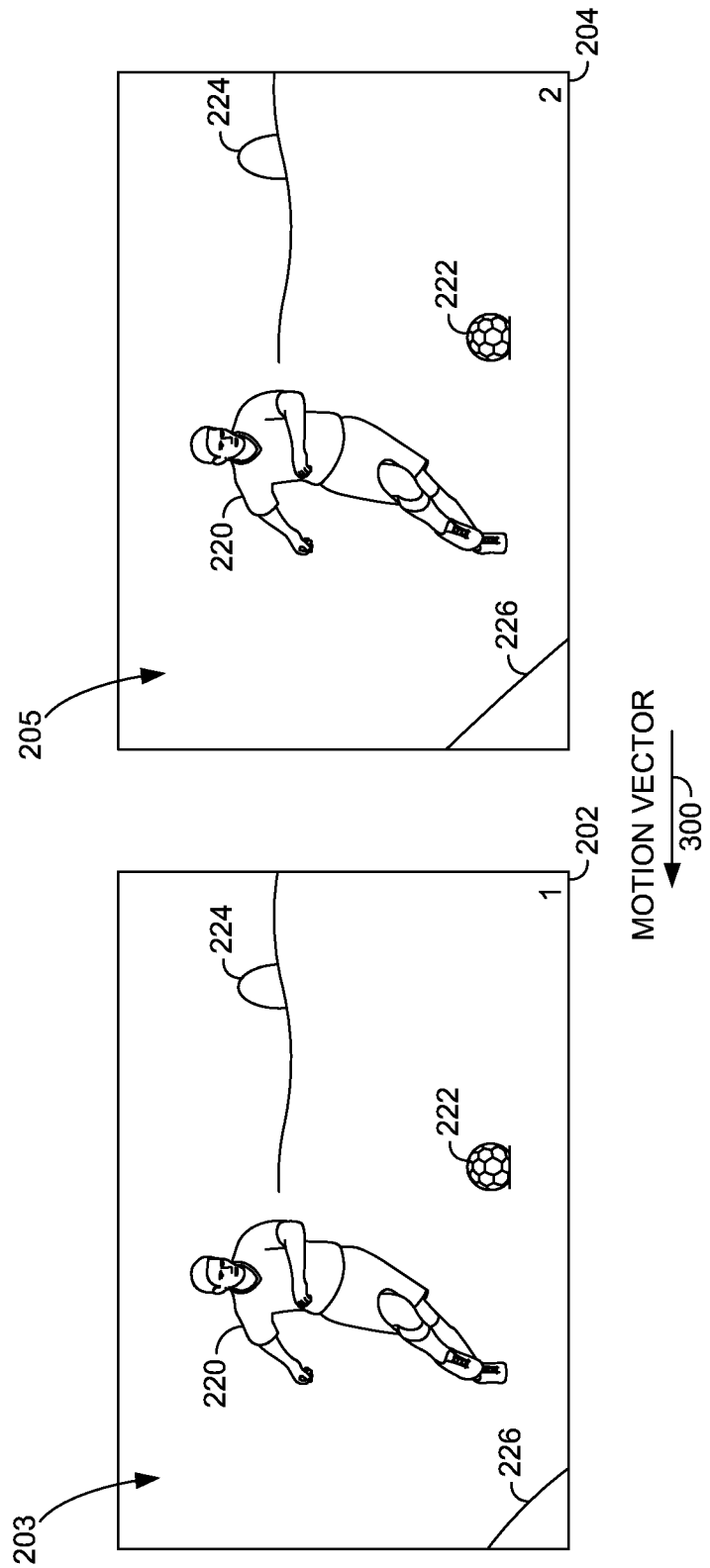
FIG. 3 is an illustration of a movement vector according to aspects of the technology described herein.

Turning now to FIG. 3, a motion vector 300 is illustrated, in accordance with an aspect of the technology described herein. FIG. 3 shows the first video frame 202 and the second video frame 204 adjacent to each other. The first video frame 202 and the second video frame 204 are consecutive frames captured a very small period of time apart, such as 1/30 of a second. Some of the differences between the first image 203 and the second image 205 are a result of changes in the moving objects, such as the soccer player 220 and the soccer ball 222. Other changes are the result of the camera moving between when the first video frame 202 and the second video frame 204 were captured. The amount the camera moved can be determined by evaluating fixed objects within the first image 203 and the second image 205. Exemplary fixed objects include the boundary line 226 and the tree 224. The location of pixels representing these objects can be compared within the first image 203 and the second image 205 to calculate a motion vector 300. The motion vector 300 is shown as simply moving to the left; however, motion vectors can also be two-dimensional or three-dimensional. In other words, a motion vector could have an X, Y, and Z component; an X and Y component; just an X component; just a Y component; or just a Z component. The X, Y, and/or Z component could reflect translation along an axis and/or rotation around an axis. Other combinations are possible including rotation measurements.

Figure 4:
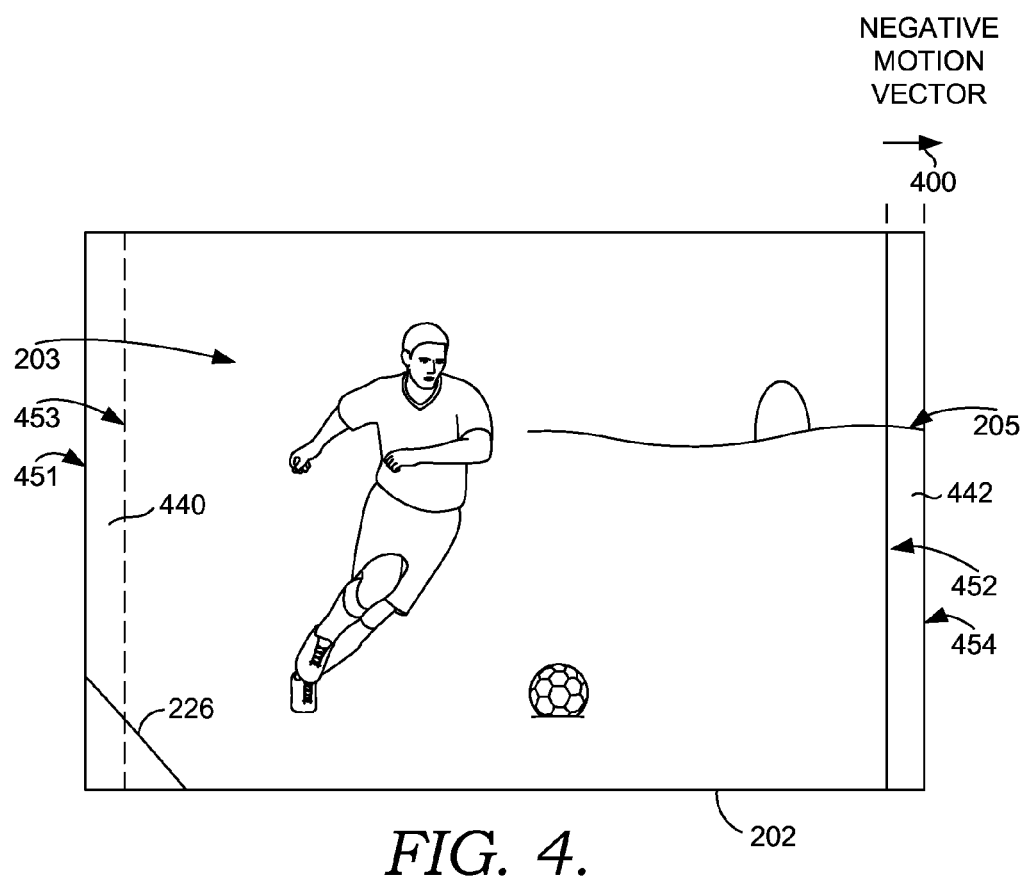
FIG. 4 is an illustration of a negative movement vector according to aspects of the technology described herein.

Turning now to FIG. 4, the application of a negative motion vector 400 on the second video frame 204 is illustrated. The previously calculated motion vector 300 shows that the camera had been translated to the left between the capture of the first video frame 202 and the second video frame 204. The camera's movement can be corrected by moving the second video frame 204 a distance and direction specified by the negative motion vector 400, in this case to the right. The negative motion vector 400 is the opposite of the motion vector 300 calculated previously. Moving the second video frame 204 to the right relative to the first frame 202 will cause the middle of the picture to overlap with the previous and subsequent frames thereby reducing the shaky appearance of the video, but a gap 440 will occur on one side of the second video frame 204 and "extra" pixels 442 will be on the other side. The gap 440 is defined by the left edge 451 of the first video frame 202 and the left edge 453 of the second video frame 204. As the video is shown, the viewer will see the left edge of the video move from left edge 451 to left edge 453. Because a border has been added to frame 204, the border will fill the gap 440 as the video is shown. On the right side, the extra pixels 442 are defined by the right edge 452 of the first video frame 202 and the right edge 454 of the second video frame 204.

Adjusting all of the frames within the video according to the calculated motion vectors can improve the stability of the main image but can cause the edges of the video to look choppy. Aspects of the technology described herein reduce the choppy appearance by adding a border to each video frame. The border allows the human mind to fill in the gaps caused by the rearrangement of the frames by maintaining the previous image in the human mind instead of interrupting this natural persistence by showing an image that looks poor. In layman's terms, the viewer will remember the pixels from the first frame 202 and the remembered pixels will appear to fill in the gap 440 created by moving the second frame 204 to the right. Attempting to add pixels that mimic the image to fill the gap would destroy the user's memory of the pixels from the first frame.

Figure 5:
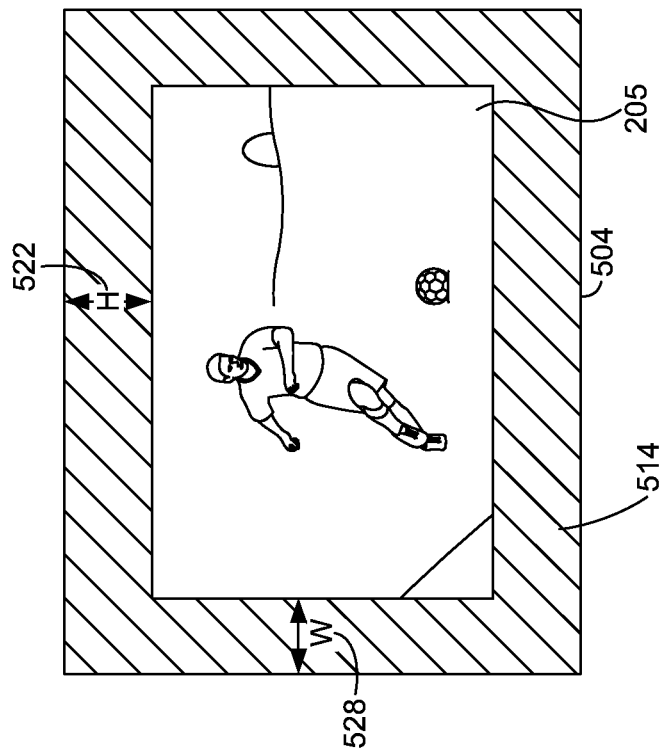
FIG. 5 is a diagram illustrating the addition of a border to a video frame without modifying the original image within the video frame, according to aspects of the technology described herein.
Figure 5:
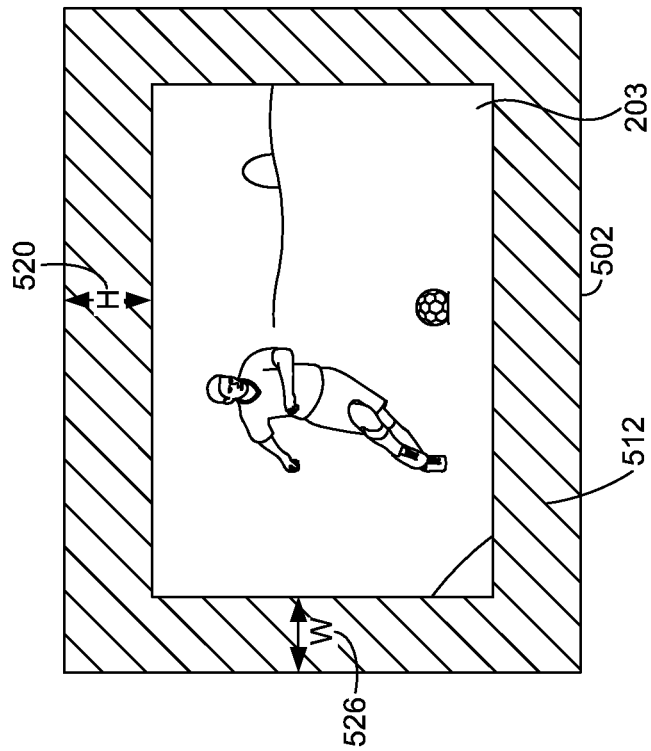

Turning now to FIG. 5, the addition of a border to a video frame is illustrated, in accordance with an aspect of the technology described herein. In the implementation illustrated in FIG. 5, the borders are added without changing the size of the original image in the original frame. FIG. 5 shows a first bordered frame 502 and a second bordered frame 504.

The bordered frame 502 comprises the first original image 203 for first video frame 202 described previously. The first original image 203 is exactly the same size and pixel density as the image from the first video frame 202. A border 512 has been added around the perimeter of the first image 203. The border 512 has a height 520 and a width 526. In this example, the height 520 and the width 526 are the same. In one aspect, the height and width of the border is greater than 10% of the width of the image. In another aspect, the width of the border is greater than 15%, such as 20%, of the image's width.

The bordered frame 504 comprises the second image 205 for the second video frame 204 described previously. The second image 205 is exactly the same size and pixel density as the image from second video frame 204. A border 514 has been added around the perimeter of the second image 205. The border 514 has a height 522 and the width 528. In this example, the height 522 and the width 528 are the same. In this example, the height 522 and the width 528 are the same as the height 520 and the width 526. This illustrates that each bordered frame generated from a video may have the same size border.

Figure 6:
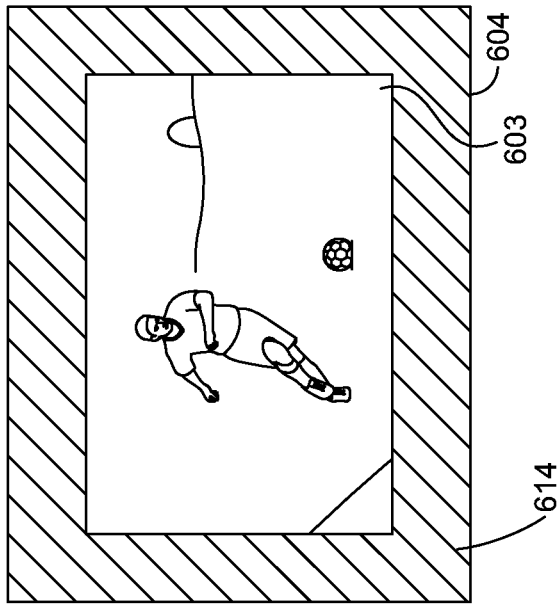
FIG. 6 is a diagram illustrating the addition of a border to a video frame by decreasing a size of the original image within the video frame, according to aspects of the technology described herein.
Figure 6:
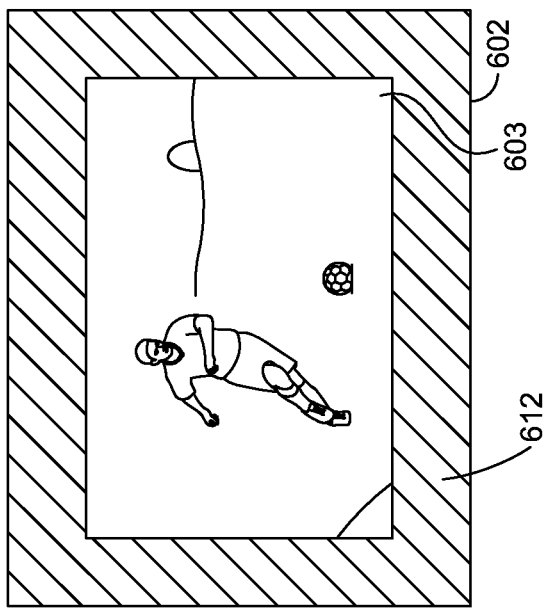

Turning now to FIG. 6, the addition of a border to a video frame while maintaining overall frame size is illustrated, in accordance with an aspect of the technology described herein. In the implementation shown in FIG. 6, the perimeter of the first bordered frame 602 and the second bordered frame 604 have the same exterior perimeter size as the first video frame 202 and the second video frame 204. In order to maintain the same overall size with the additional border, the image is first reduced in size and then a border is added. Thus, image 603 is the same as first image 203 except that it has been reduced by a certain percentage, such as 5%, 10%, 15%, 20%, or such. The borders 612 and 614 fill the area between the reduced sized images 603 or 605 and the original perimeter of the video frames.

Figure 7:
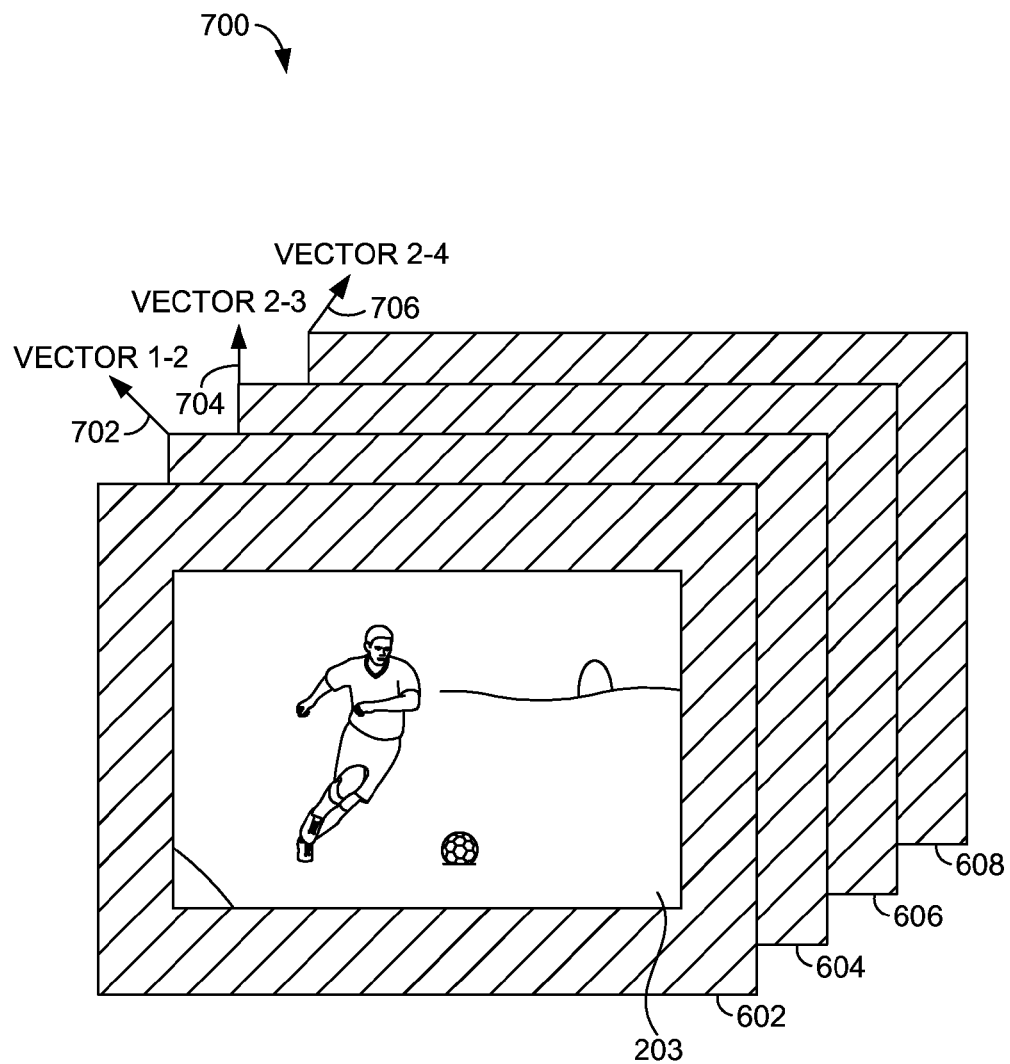
FIG. 7 is a diagram illustrating a stabilized video, according to aspects of the technology described herein.

Turning now to FIG. 7, generation of a stabilized video comprising bordered frames is illustrated, in accordance with an aspect of the technology described herein. The stabilized video 700 comprises a plurality of bordered frames 602, 604, 606, and 608. The bordered frames could have been generated as described previously. The relative location of the bordered frames is adjusted relative to the location of other frames according to a movement vector calculated, as described previously. Each frame can be moved according to a negative movement vector, which attempts to move the image the opposite direction that the camera moved between recording consecutive images. For example, the negative movement vector 702 between the first and second frames could cause the second bordered frame 604 to be moved up and to the left relative to the bordered frame 602. The negative movement vector 704 between the second and third frames could cause the third bordered frame 606 to be moved up. The negative movement vector 706 between the third and the fourth frames could cause the fourth bordered frame 608 to be moved up and to the right. It should be noted that the example shown here is for illustration purposes and is not intended to be limiting. In an actual implementation, a movement vector may be calculated across a series of frames and individual frames moved according to an overall pattern.

When the stabilized video is output for display, then the borders are fixed in relation to video image frames and the bordered frames can gyrate within a frame formed by an active display area of a display screen. The gyrations can be apparent around the exterior of the frames where gaps are created as the bordered frame locations are adjusted according to a negative motion vector. The gyrations are apparent when the border color differs from a background display color.

Figure 8:
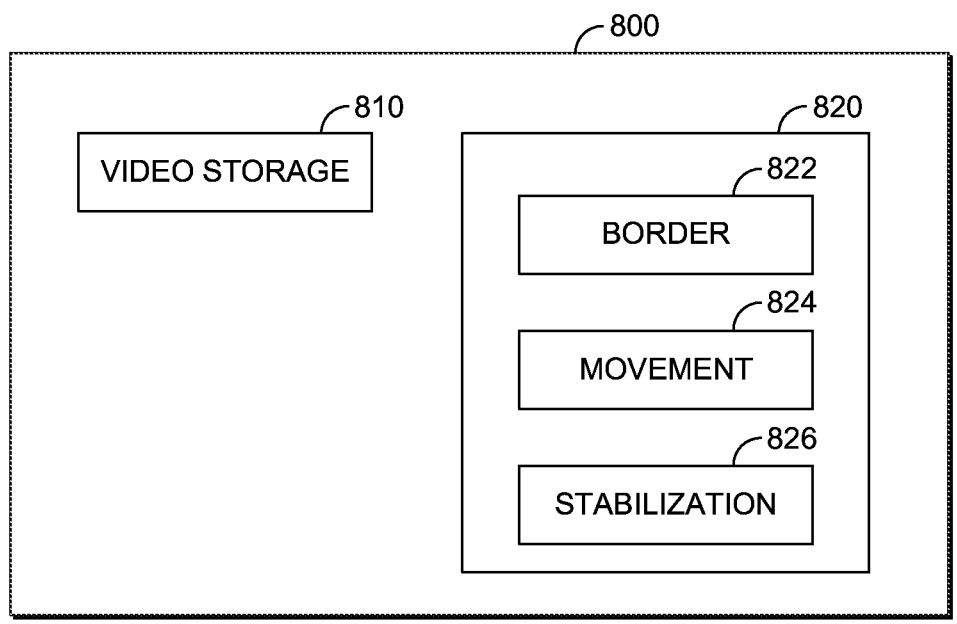
FIG. 8 is a diagram illustrating a computing system adapted to edit videos to improve stabilization, according to aspects of the technology described herein.

Turning now to FIG. 8, a computing system 800 suitable for editing video to improve stabilization is shown, in accordance with an aspect of the technology described herein. The computing system 800 includes video storage 810 and a video editing engine 820. The video editing engine 820 includes a border component 822, a movement analysis component 824, and a stabilization component 826. The video editing engine 820 may use a graphics processing unit to perform various functions described subsequently. The computing system 800 could be a personal computer, a smartphone, a game system, a tablet, a data center, or some other suitable computing device.

The video storage component 810 comprises computer storage media having sufficient capacity to store one or more original videos and one or more edited or stabilized videos.

The border component 822 receives a video frame for a plurality of video frames from the video storage and adds a border to the frames, generating a bordered frame. As mentioned, the border can be added without changing the original image by increasing the overall size of the bordered frame relative to the corresponding original frame. Alternatively, the image in the original frame can be reduced in order to accommodate a border while maintaining the same overall size of a video frame.

The movement analysis component 824 generates a motion vector by analyzing the plurality of video frames. The motion vector estimates camera movement while the video was filmed. Video image stabilization is a digital signal processing technique that can be applied to video to correct shaky video motion from hand shakiness or other causes. In one exemplary aspect, the technique involves calculating local motion vectors for macroblocks of each image of the video sequence relative to its preceding image. Once a fixed object is identified, its location within each consecutive image can be calculated and a movement vector calculated by taking the difference between the object's location in the first frame and the second frame. Aspects of the technology described herein can then adjust the consecutive image's relative location to each other by shifting or warping the image in a direction opposite to the estimated motion vector. For example, if the movement vector calculated for a first frame and a second frame is 1 mm to the left then the second frame could be moved 1 mm to the right to help correct the shaky appearance of the video. This process can then be repeated for each consecutive frame. As an alternative, a movement vector is calculated across a series of frames and then the frames are adjusted towards a midpoint of the various movement vectors. Either way, the end result is an updated video where the images have been adjusted relative to one another in a way that tries to undo the movement of the camera.

The stabilization component 826 generates a stabilized video by adjusting the relative location of the bordered frames according to a negative of the motion vector.

Figure 9:
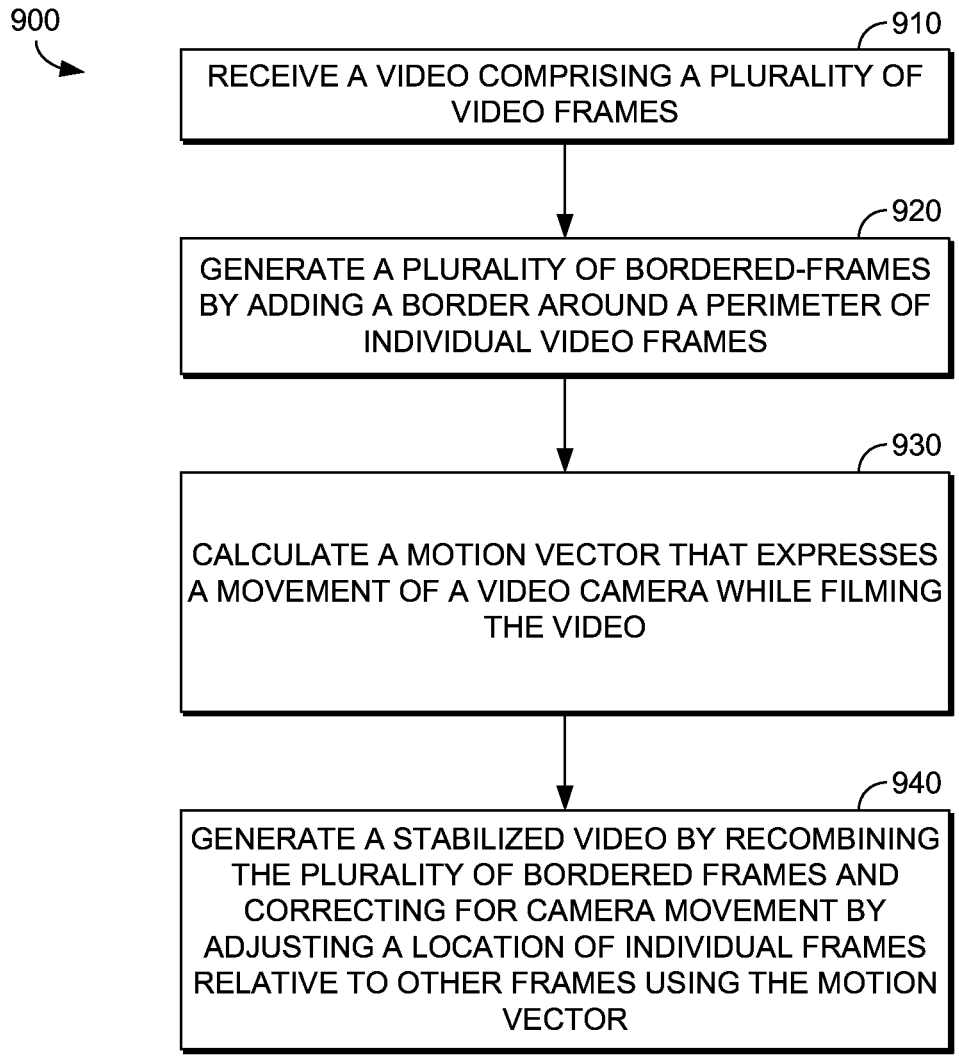
FIG. 9 is a flow chart showing a video editing method, according to aspects of the technology described herein.

Turning now to FIG. 9, a video editing method 900 is described, according to an aspect of the technology described herein. The video editing method 900 may be performed by a camera that records a video or by any other computing device to which a video is transferred for editing.

At step 910, a video comprising a plurality of video frames is received for editing. At step 920, a plurality of bordered frames is generated by adding a border around a perimeter of individual video frames. As mentioned, the border can be added without changing the original image by increasing the overall size of the bordered frame relative to the corresponding original frame. Alternatively, the image in the original frame can be reduced in order to accommodate a border while maintaining the same overall size of a video frame.

At step 930, a motion vector is calculated that expresses a movement of a video camera between recording two consecutive frames in the video. The motion vector estimates camera movement while the video was filmed. Video image stabilization is a digital signal processing technique that can be applied to video to correct shaky video motion from hand shakiness or other causes. In one exemplary aspect, the technique involves calculating local motion vectors for macroblocks of each image of the video sequence relative to its preceding image.

At step 940, a stabilized video is generated by recombining the plurality of bordered frames and correcting for camera movement by adjusting a location of individual frames relative to other frames using the motion vector. For example, the frames' locations may be adjusted according to a negative of the motion vector. The stabilized video may be saved in computer storage for later viewing.

Figure 10:
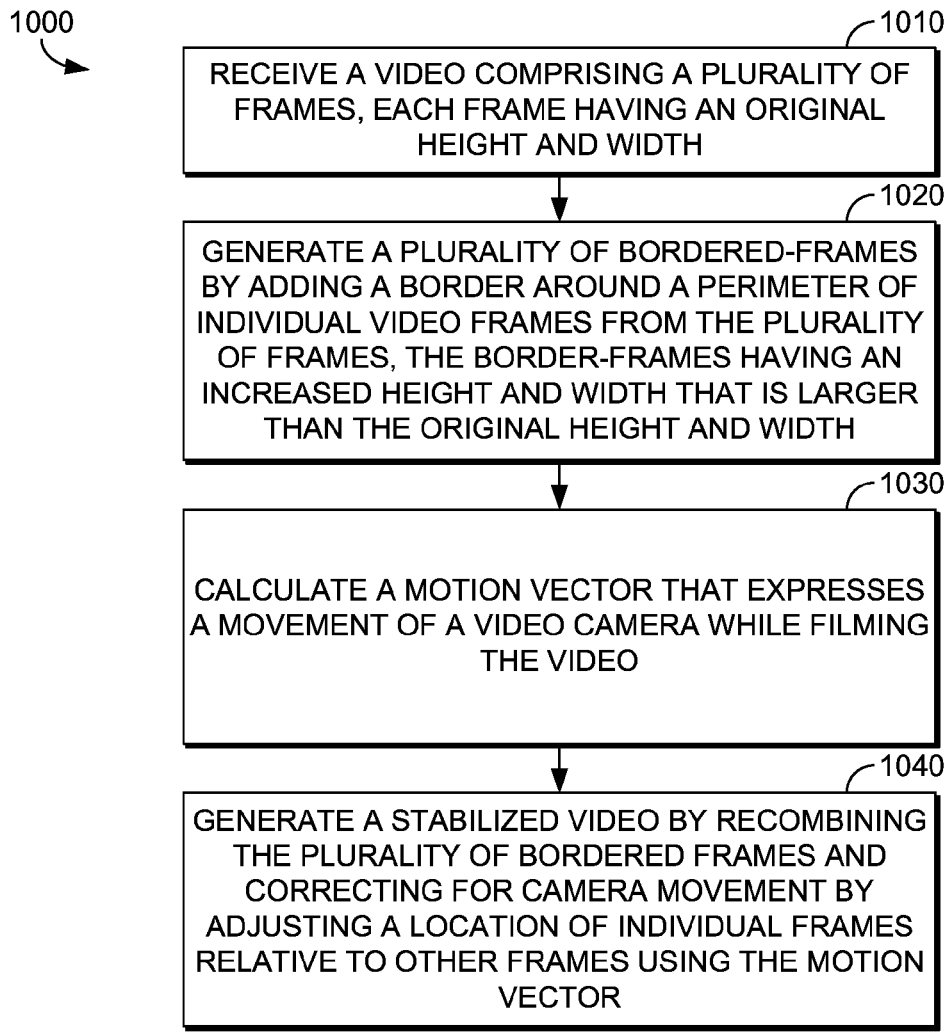
FIG. 10 is a flow chart showing a video editing method, according to aspects of the technology described herein.

Turning now to FIG. 10, a video editing method 1000 is described, according to an aspect of the technology described herein. The video editing method 1000 may be performed by a camera that records a video or by any other computing device to which a video is transferred for editing.

At step 1010, a video comprising a plurality of frames is received. Each frame has an original height and width. The video may be designated for editing by a user and then retrieved from storage for editing.

At step 1020, a plurality of bordered frames is generated by adding a border around a perimeter of individual video frames from the plurality of frames. The bordered frames have an increased height and width that is larger than the original height and width. The border can be added without changing the original image by increasing the overall size of the bordered frame relative to the corresponding original frame.

At step 1030, a motion vector is calculated that expresses a movement of a video camera during recording of the video. The motion vector estimates camera movement while the video was filmed. Video image stabilization is a digital signal processing technique that can be applied to video to correct shaky video motion from hand shakiness or other causes. In one exemplary aspect, the technique involves calculating local motion vectors for macroblocks of each image of the video sequence relative to its preceding image.

At step 1040, a stabilized video is generated by recombining the plurality of bordered frames and correcting for camera movement by adjusting a location of individual frames relative to other frames using the motion vector. For example, the frames' locations may be adjusted according to a negative of the motion vector. The stabilized video may be saved in computer storage for later viewing.

In one example implementation, the digital video image stabilization techniques described above, including methods 900 and 1000, are implemented in an executable program such as a dynamic link library file (DLL) or as an application program executable file. When implemented as a DLL or other executable library file, the executable program implements the digital video image stabilization as a set of library functions and provides a programmatic interface for application programs to make programmatic use of the digital video image stabilization functionality implemented by the executable program. The executable program can run on a generic platform or computing environment, which is to say that the executable program can run on a variety of computers and computing devices that may include varying multimedia digital signal processing (DSP) components.

Embodiments of the technology described herein have been described in relation to particular embodiments, which are intended in all respects to be illustrative rather than restrictive. Alternative embodiments will become apparent to those of ordinary skill in the art to which the present invention pertains without departing from its scope.

Embodiment 1

A computing system comprising: a processor; and computer storage memory having computer-executable instructions stored thereon which, when executed by the processor, implement a method of video editing to correct for camera movement during video recording, the method comprising: receiving a video comprising a plurality of frames, each frame having an original height and width; generating a plurality of bordered frames by adding a border around a perimeter of individual video frames from the plurality of frames; calculating a motion vector that expresses a movement of a video camera while filming the video; and generating a stabilized video by recombining the plurality of bordered frames and correcting for the movement by adjusting a location of individual frames relative to other frames using the motion vector.

Embodiment 2

The computing system of embodiment 1, wherein a bordered frame has an increased height and width that is larger than the original height and width.

Embodiment 3

The computing system of embodiment 1, wherein a bordered frame has a height and width that is equal to the original height and width.

Embodiment 4

The computing system of any one of the preceding embodiments, wherein the border has a width that is greater than 5% of the original height.

Embodiment 5

The computing system of any one of the preceding embodiments, wherein the processor is a graphics processing unit.

Embodiment 6

The computing system of any one of the preceding embodiments, wherein portions of an image from an earlier frame in the video are not added to subsequent frames.

Embodiment 7

One or more computer storage media storing computer-executable instructions that, when executed by a computing device having a processor, cause the computing device to generate a stabilized video, the method comprising: receiving a video comprising a plurality of video frames; generating a plurality of bordered frames by adding a border around a perimeter of individual video frames; calculating a motion vector that expresses a movement of a video camera while filming the video; and generating a stabilized video by recombining the plurality of bordered frames and correcting for the movement by adjusting a location of individual frames relative to other frames using the motion vector.

Embodiment 8

The media of embodiment 7, wherein adding the border comprises shrinking an image in a frame by a percentage and adding the border from a perimeter of a shrunken image to an original outside perimeter of the image.

Embodiment 9

The media of embodiment 8, wherein the percentage is between 10% and 20%.

Embodiment 10

The media of embodiment 7, wherein adding the border comprises adding the border that extends from a perimeter of original images in the individual video frames, the border having a width.

Embodiment 11

The media of embodiment 10, wherein the width is about 15% of a width of the original images.

Embodiment 12

The media of any one of the preceding embodiments, wherein the border is black.

Embodiment 13

The media of embodiment 7, wherein the width is an average of the motion vector for each frame in the video plus a standard deviation of the average of the motion vector.

Embodiment 14

A video editing method comprising: receiving a video comprising a plurality of frames, each frame having an original height and width; generating a plurality of bordered frames by adding a border around a perimeter of individual video frames from the plurality of frames, wherein individual bordered frames have an increased height and width that is larger than the original height and width; calculating a motion vector that expresses a movement of a video camera while recording the video; and generating a stabilized video by recombining the plurality of bordered frames and correcting for the movement by adjusting a location of individual frames relative to other frames using the motion vector.

Embodiment 15

The method of embodiment 14, wherein the increased height and width are more than 5% larger than the original height and width.

Embodiment 16

The method of embodiment 14, wherein the increased height and width are more than 10% larger than the original height and width.

Embodiment 17

The method of embodiment 14, wherein the increased height and width are more than 20% larger than the original height and width.

Embodiment 18

The method of any one of claim 14, 15, 16, or 17, wherein each frame in the plurality of frames includes an image having a height, width, and resolution that is not changed when the border is added to the frame.

Embodiment 19

The method of any one of claim 14, 15, 16, 17, or 18, wherein images from an earlier frame in the video are not added to subsequent frames.

Embodiment 20

The method of any one of claim 14, 15, 16, 17, 18, or 19 wherein the border is black.

Aspects of the invention have been described to be illustrative rather than restrictive. It will be understood that certain features and subcombinations are of utility and may be employed without reference to other features and subcombinations. This is contemplated by and is within the scope of the claims.

The invention claimed is:

1. A computing system comprising:
a processor; and
computer storage media having computer-executable instructions stored thereon which, when executed by the processor, implement a method of video editing to correct for camera movement during video recording, the method comprising:
receiving a video comprising a plurality of frames, each frame having an original height and width;
generating a plurality of bordered frames by adding a border around a perimeter of individual video frames from the plurality of frames;
calculating a motion vector that expresses a movement of a video camera while filming the video; and
generating a stabilized video by recombining the plurality of bordered frames and correcting for the movement by adjusting a location of individual frames relative to other frames using the motion vector,
wherein a width of the border is an average of the motion vector for each frame in the video plus a standard deviation of the average of the motion vector.

2. The computing system of claim 1, wherein a bordered frame has an increased height and width that is larger than the original height and width.

3. The computing system of claim 1, wherein a bordered frame has a height and width that is equal to the original height and width.

4. The computing system of claim 1, wherein the border has a width that is greater than 5% of the original height.

5. The computing system of claim 1, wherein the processor is a graphics processing unit.

6. The computing system of claim 1, wherein portions of an image from an earlier frame in the video are not added to subsequent frames.

7. One or more computer storage media storing computer-executable instructions that, when executed by a computing device having a processor, cause the computing device to generate a stabilized video, the method comprising:
receiving a video comprising a plurality of video frames;
generating a plurality of bordered frames by adding a border around a perimeter of individual video frames;
calculating a motion vector that expresses a movement of a video camera while filming the video; and
generating a stabilized video by recombining the plurality of bordered frames and correcting for the movement by adjusting a location of individual frames relative to other frames using the motion vector, wherein a width of the border is an average of the motion vector for each frame in the video plus a standard deviation of the average of the motion vector.

8. The media of claim 7, wherein adding the border comprises shrinking an image in a frame by a percentage and adding the border from a perimeter of a shrunken image to an original outside perimeter of the image.

9. The media of claim 8, wherein the percentage is between 10% and 20%.

10. The media of claim 7, wherein adding the border comprises adding the border that extends from a perimeter of original images in the individual video frames, the border having a width.

11. The media of claim 10, wherein the width is about 15% of a width of the original images.

12. The media of claim 7, wherein the border is black.

13. The media of claim 7, wherein portions of an image from an earlier frame in the video are not added to subsequent frames.

14. A video editing method comprising:

receiving a video comprising a plurality of frames, each frame having an original height and width;

generating a plurality of bordered frames by adding a border around a perimeter of individual video frames from the plurality of frames, wherein individual bordered frames have an increased height and width that is larger than the original height and width;

calculating a motion vector that expresses a movement of a video camera while recording the video; and generating a stabilized video by recombining the plurality of bordered frames and correcting for the movement by adjusting a location of individual frames relative to other frames using the motion vector, wherein a width of the border is an average of the motion vector for each frame in the video plus a standard deviation of the average of the motion vector.

15. The method of claim 14, wherein the increased height and width are more than 5% larger than the original height and width.

16. The method of claim 14, wherein the increased height and width are more than 10% larger than the original height and width.

17. The method of claim 14, wherein the increased height and width are more than 20% larger than the original height and width.

18. The method of claim 14, wherein each frame in the plurality of frames includes an image having a height, width, and resolution that is not changed when the border is added to the frame.

19. The method of claim 14, wherein images from an earlier frame in the video are not added to subsequent frames.

20. The method of claim 14, wherein the border is black.

* * * * *